Dec. 20, 1955   J. A. MARKOSKI   2,727,865
LUMINESCENT COMPOSITION
Filed Dec. 20, 1952
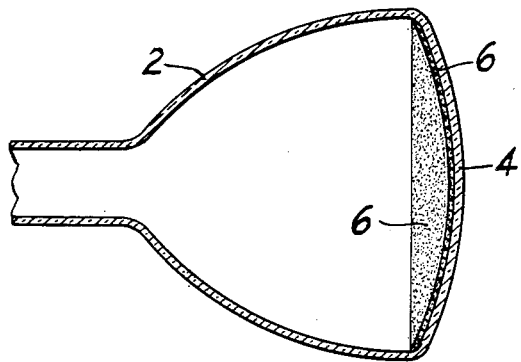
INVENTOR.
JOHN A. MARKOSKI
BY   W.S. Hill
ATTORNEY United States Patent Office 2,727,865
Patented Dec. 20, 1955

2,727,865

LUMINESCENT COMPOSITION

John A. Markoski, Lancaster, Pa., assignor to Radio Corporation of America, a corporation of Delaware Application December 20, 1952, Serial No. 327,140

6 Claims. (Cl. 252—301.6)

This invention relates to improved phosphor compositions and more particularly to improved phosphor compositions which are especially useful for black-and-white television kinescope viewing screens. The invention also relates to improved viewing screens containing the improved compositions.

Although a number of different types of phosphor compositions have been used for making the viewing screens of cathode ray kinescopes used in black-and-white television, one of the most acceptable of these has been a composition containing a particular yellow-emitting phosphor component and a particular blue-emitting component. Since yellow and blue are complementary colors, a proper blending of phosphors emitting these two colors will produce a screen that emits white light.

In order to obtain a white emission that is acceptable as to shade, however, not only is it necessary to make a careful selection of phosphors to get the right shades of yellow and blue for blending, but to produce a blend that will give the desired white at all operating voltages and currents to which the tube will be subjected in normal use.

It has previously been found that acceptable white-emitting screens for black-and-white television can be made by blending a zinc-cadmium sulfide made up of 47% ZnS and 53% CdS and activated with 0.01% by weight silver, and a zinc sulfide phosphor activated with 0.015% by weight silver. The zinc-cadmium sulfide phosphor emits mainly in the yellow region of the spectrum while the zinc sulfide phosphor has peak emission in the blue. In making the screen composition, 42% by weight of the blue-emitting phosphor is mixed with 58% by weight of the yellow-emitting phosphor for a screen weight of 3.5 mg./sq. cm. The relative proportion of zinc sulfide to cadmium sulfide in the zinc-cadmium sulfide phosphor and the relative proportion of zinc-cadmium sulfide to zinc sulfide can be varied a great deal depending upon the particular shade of color emission desired, however. This depends upon personal tastes. For uses other than black-and-white television, much wider variations of proportions can also be used.

Although the white-emitting phosphor blends above described have proved commercially satisfactory, when used in making viewing screens for television kinescopes, they have certain manufacturing disadvantages. The luminescent screen is usually formed by settling a suspension of the phosphor so that it deposits on the inner face of the viewing screen of the kinescope. Since the screen weight is usually only about 3.5 to 4.5 mg./sq. cm., a relatively small variation in weight can cause a fairly large percentage variation. But, it has been observed that even small changes in screen weight can cause noticeable variations in screen color under cathode ray excitation. For example, a 10% variation in screen weight may cause a change of 600° K. in screen color. This is undesirable since, in mass production of kinescopes, screen weight sometimes varies by several percent from tube to tube and from one part of a particular screen to another, and sometimes the variation runs over 10%.

The reason for this color variation is that the yellow-emitting component absorbs some of the blue emission of the blue-emitting component and the absorption increases with screen thickness. Thus, wherever there are variations in screen thickness there may be noticeable and undesirable variations in emission color.

One object of the present invention is to provide improved phosphor compositions for use in viewing screens of black-and-white television kinescopes.

Another object of the invention is to provide an improved phosphor composition for black-and-white television kinescopes exhibiting relatively low color variation with variation in screen weight.

Another object of the invention is to provide an improved phosphor composition having relatively low light absorption in the visible region of the spectrum.

Another object of the invention is to provide improved luminescent viewing screens for black-and-white television kinescopes.

These and other objects will be more apparent and the invention will be more readily understood from the detailed description which follows and from the accompanying drawing of which the single figure is an elevation sectional view of one embodiment of a cathode ray tube envelope including a viewing screen made in accordance with the present invention.

In general, the invention comprises providing a phosphor blend of yellow-to-red emitting zinc-cadmium sulfide phosphor which comprises a solid solution of zinc sulfide and cadmium sulfide, and containing only 0.001–0.003% by weight silver activator and a blue-emitting phosphor such as zinc sulfide with silver activator. This phosphor composition may be applied to the inner face of the viewing screen of a cathode ray tube which is to be used for black-and-white television, or for other purposes. It has been found that by using the smaller percentages of silver activator in the zinc-cadmium sulfide phosphor the light absorption of this phosphor in the visible region can be appreciably reduced without much reduction in light output efficiency. Therefore, variations in screen thickness of screens using this phosphor do not have as much corresponding variation in emission color.

A preferred example of preparation of a phosphor composition and a viewing screen suitable for black-and-white television, in accordance with the present invention, will now be given.

*Example*

The zinc-cadmium sulfide phosphor with silver activator may first be prepared as follows.

Adjusting the relative amounts of the ingredients so as to produce a material consisting essentially of 47% by weight CdS and 53% by weight ZnS with 0.002% by weight Ag as activator, prepare a mixture of solutions of zinc sulfate and silver nitrate and precipitate the metals as sulfides by passing $H_2S$ through the solution mixture. Add a solution of cadmium sulfate to the reaction vessel and pass $H_2S$ through to precipitate the cadmium as CdS.

The precipitate is washed thoroughly with distilled water as by repeated stirring and settling in fresh quantities of the wash water. After drying, 1.0% by weight NaCl and 1.0% by weight $CaCl_2$ are added as fluxes and the mixture is dried at 175° C.

After breaking up any lumps that may be present, the material is packed in silica crucibles, baked for three hours at 175° C. and then fired for two hours at 1000° C. After cooling, and discarding discolored material, the fired product is suspended in distilled water, then for each 100 gms. of phosphor, 9 cc. of trisodium phosphate solution (sp. gr. 1.060) is added slowly with continuous, vigorous stirring. The sulfide precipitate is then washed until it contains not more than 0.0003% chloride ion and dried for 24 hours at 175° C.

The zinc sulfide phosphor with .015% silver activator is conventional and may be prepared by any convenient method which has been described in the literature. It may, for example, be prepared in a manner which is very similar to the method of preparing the zinc-cadmium sulfide described above. The zinc sulfide with the added silver activator may first be precipitated by passing $H_2S$ through a solution of zinc sulfate and silver nitrate. The washed precipitate may then be mixed with 2% NaCl flux and the mix baked at 390° C. for three hours and fired at 1000° C. for two hours. 100 gms. of product may then be suspended in 4 parts (by weight) of water to which has been added 1.6 cc. of $CaCl_2$ solution (sp. gr. 1.184). This suspension is agitated and 9 cc. of trisodium phosphate (sp. gr. 1.060) is added with continued stirring. The treated phosphor is then washed and dried at 175° C.

The zinc-cadmium sulfide phosphor and the zinc sulfide phosphor may then be mixed in the proportion of 60% by weight of the former and 40% by weight of the latter to form a white-emitting composition in aluminized tubes, with 3.5 mg./sq. cm. screens.

Referring to the drawing, there may be provided a cathode ray tube envelope 2 having a glass face plate 4. To form a luminescent viewing screen 6 on the inner surface of the face plate, the improved phosphor composition may be applied by any conventional method as by settling from an aqueous suspension. In this method, a cushioning layer comprising several hundred cc. of distilled water is first poured into the tube envelope which is maintained in upright position. An aqueous suspension of the phosphor is then poured in on top of the cushioning liquid, the phosphor is permitted to settle onto the face plate, and the liquid is then poured off very slowly by gradually tilting the tube envelope away from the vertical position. The layer of phosphor is then dried and baked to harden it and drive off all volatile constituents. Other methods of forming the screen may be used such as spraying, or dusting the phosphor powder on a thin layer of binder which is spread over the face plate of the tube.

For television kinescopes a screen weight of about 3.5–4.5 mg./sq. cm. is preferred although screen weights of 3 to 8 mg./sq. cm. may be used for operation at 6 to 12 kv. Different operating voltages require different proportions of the blue and yellow components for constant color.

Some variations can be made in the process described above without departing from the scope of the present invention. The most critical feature is the percentage of silver activator in the zinc-cadmium sulfide phosphor. This should be kept within the range of 0.001 to 0.003% by weight.

The relative proportions of ZnS and CdS in the zinc-cadmium sulfide phosphor may be greatly varied depending upon the peak emission color desired. Increasing the proportion of ZnS shifts the peak emission toward the blue, while increasing the proportion of CdS shifts the emission toward the red. In the present invention it is desired to include only those zinc-cadmium phosphors emitting in the yellow to red region. The proportion of ZnS to CdS may be varied from about 50:50 to about 15:85 percent by weight.

For the zinc sulfide phosphor component it is desired to include any blue-emitting, silver-activated material, hence any proportion of silver activator capable of producing this emission is permissible. As a general rule, any proportion of silver between zero and about 0.02% by weight may be used. If no silver is present, a halide flux must be used to get sufficient luminescence efficiency.

The relative proportions of the zinc-cadmium sulfide phosphor and zinc sulfide phosphor in the final composition can also be varied considerably, but for black-and-white television it is preferred to include only those mixtures which will produce a white or near-white emission effect. For other uses, other proportions may be used.

When the zinc-cadmium sulfides with low silver activator content as described above are used instead of the usual zinc-cadmium sulfides with higher silver content, screens composed of the improved composition of zinc-cadmium sulfide and blue-emitting zinc sulfide, or any other blue-emitting phosphor, show almost no noticeable color variation due to the usual variations in screen weight that occur in the normal manufacturing processes.

The blue-emitting component is not limited to zinc sulfide with silver activator. It may be any other compatible blue-emitting phosphor having suitable emission color, efficiency, stability, decay time, etc., such as titanium activated calcium-magnesium silicate.

What is claimed is:

1. A luminescent composition having substantially white emission under cathode ray excitation comprising a yellow-to-red emitting zinc-cadmium sulfide phosphor having a proportion of ZnS to CdS between 50:50 to 15:85% by weight with 0.001 to 0.003% by weight silver activator and a blue-emitting, silver-activated zinc-sulfide phosphor.

2. A composition according to claim 1 in which said yellow-emitting phosphor and said blue-emitting phosphors are present in the proportion of 60% and 40% respectively.

3. A composition according to claim 2 in which said zinc-cadmium sulfide phosphor has 0.002% silver activator.

4. A luminescent composition having substantially white emission under cathode ray excitation comprising a yellow-to-red emitting zinc-cadmium sulfide phosphor having a proportion of ZnS to CdS between 50:50 to 15:85% by weight with 0.001 to 0.003% by weight silver activator and another phosphor compatible therewith having peak emission in the blue region of the spectrum.

5. A luminescent composition according to claim 1 in which said zinc sulfide phosphor has about .015% silver activator.

6. A luminescent composition having substantially white emission under cathode ray excitation comprising a mixture of a yellow-emitting zinc-cadmium sulfide phosphor having a proportion of ZnS to CdS between 50:50 to 15:85% by weight with 0.001 to 0.003% by weight silver activator and a zinc sulfide phosphor acticated with up to about 0.02% by weight silver.

References Cited in the file of this patent

UNITED STATES PATENTS 2,352,035   Strubig _____ June 20, 1944

FOREIGN PATENTS 662,154   Great Britain _____ Dec. 5, 1951

OTHER REFERENCES

Leverenz: Luminescence of Solids, 1950, Table 21. (Copy in Scientific Library.)